April 18, 1939. E. E. HEWITT 2,155,225
EMPTY AND LOAD APPARATUS
Filed April 11, 1936 3 Sheets-Sheet 1
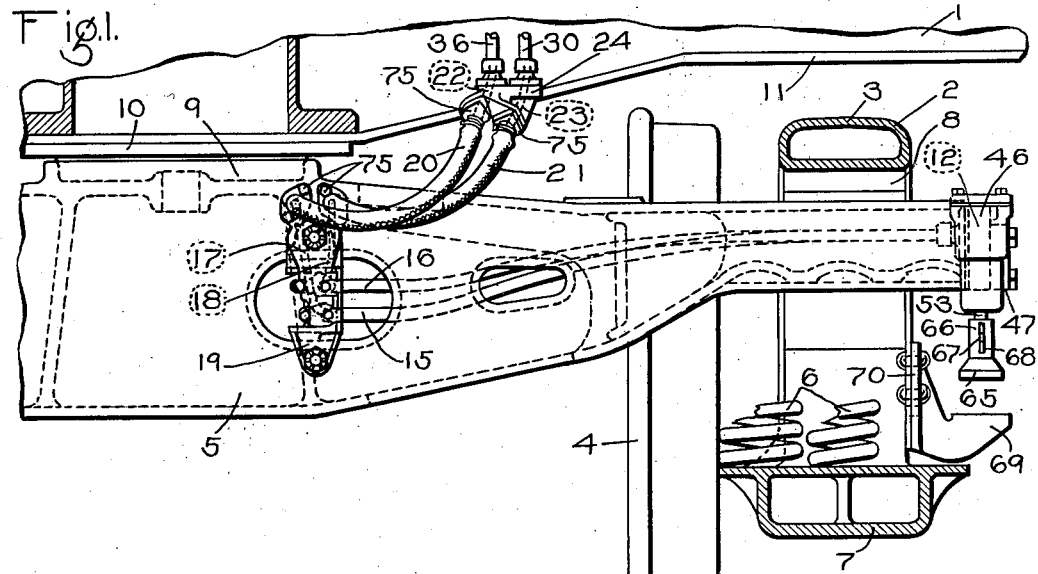
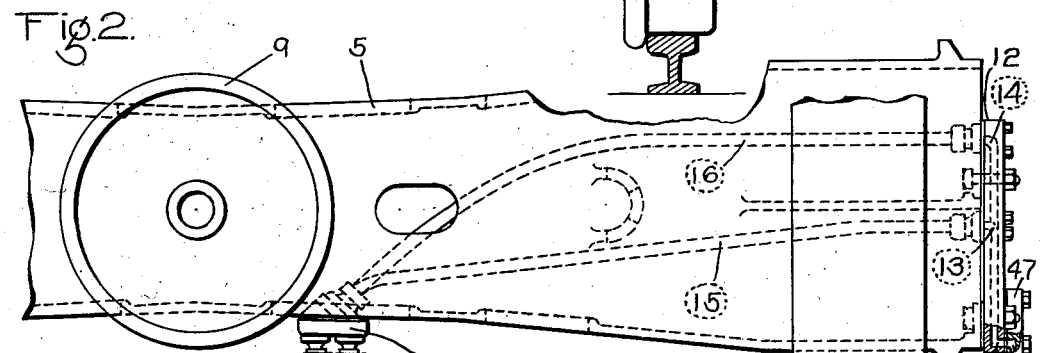
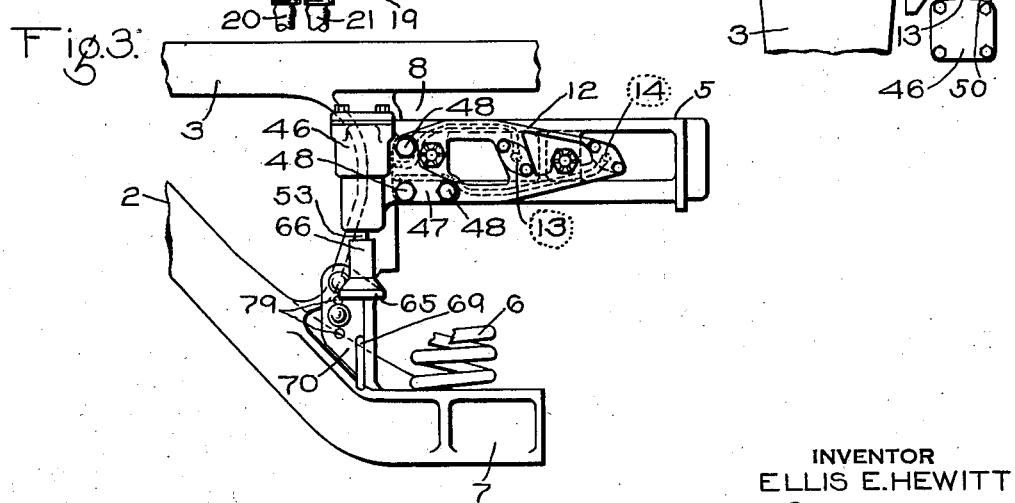
INVENTOR
ELLIS E. HEWITT
BY *Wm. M. Cady*
ATTORNEY April 18, 1939. E. E. HEWITT 2,155,225
EMPTY AND LOAD APPARATUS
Filed April 11, 1936 3 Sheets-Sheet 2
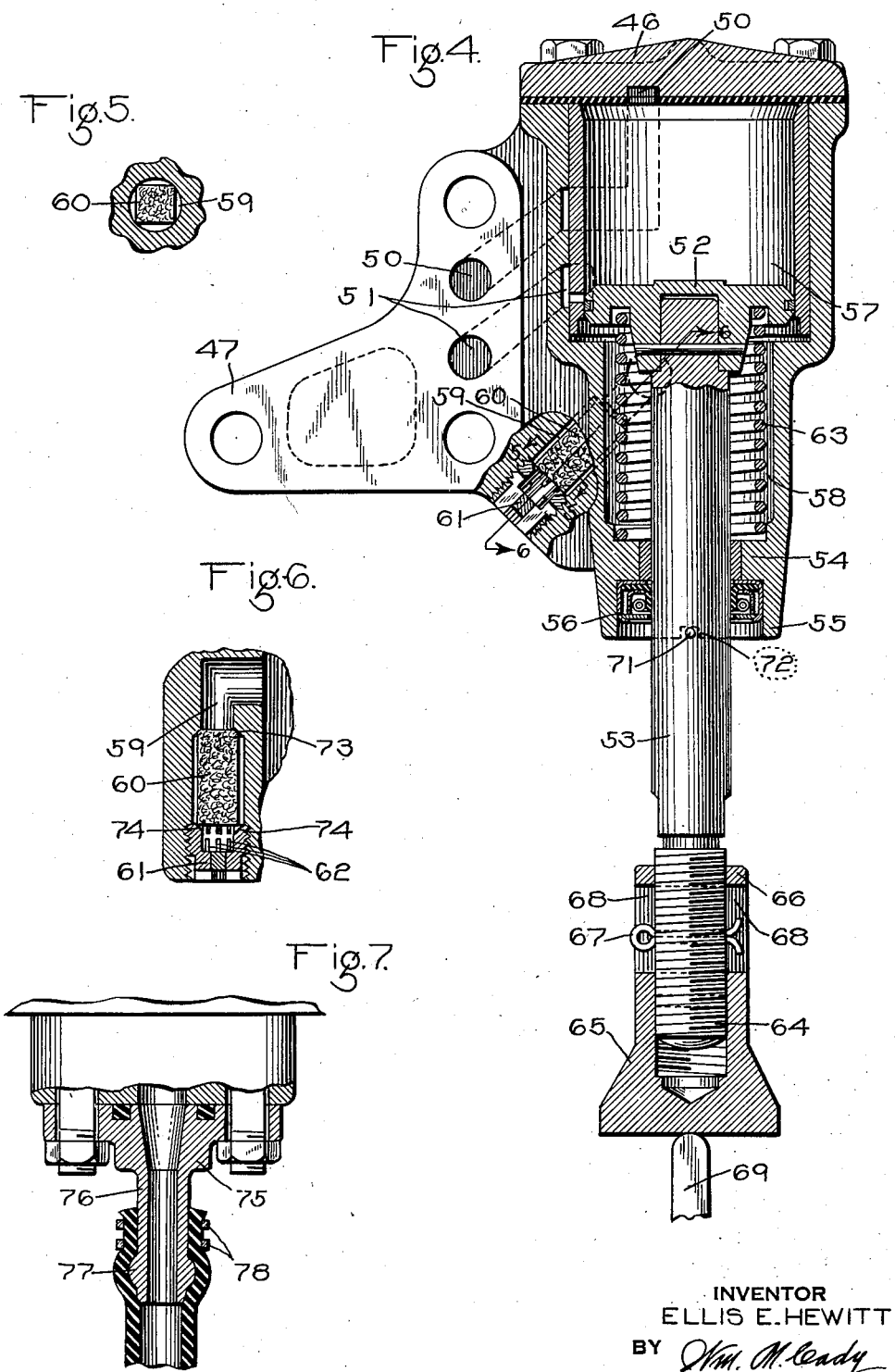
INVENTOR
ELLIS E. HEWITT
BY Wm. M. Cady
ATTORNEY April 18, 1939.          E. E. HEWITT          2,155,225
              EMPTY AND LOAD APPARATUS
              Filed April 11, 1936          3 Sheets-Sheet 3
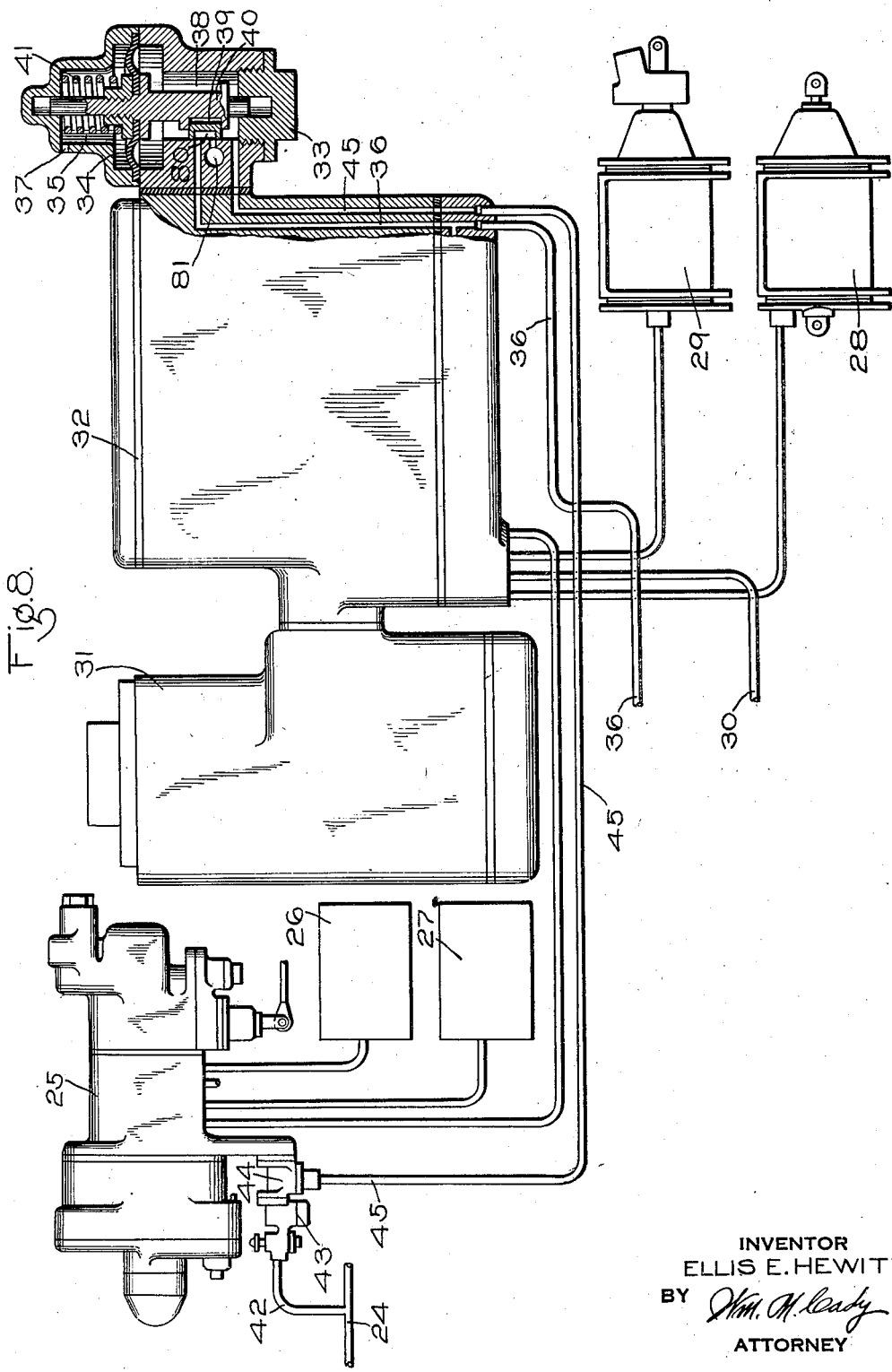
INVENTOR
ELLIS E. HEWITT
BY *Wm. M. Cady*
ATTORNEY Patented Apr. 18, 1939

2,155,225

UNITED STATES PATENT OFFICE

2,155,225

EMPTY AND LOAD APPARATUS

Ellis E. Hewitt, Edgewood, Pa., assignor to The Westinghouse Air Brake Company, Wilmerding, Pa., a corporation of Pennsylvania Application April 11, 1936, Serial No. 73,915

14 Claims. (Cl. 303—1)

This invention relates to empty and load brake equipment for vehicles, and more particularly to that type of equipment which is adapted to be automatically set or conditioned for either light or heavy load braking according to the position the vehicle body assumes relative to a fixed part of a truck of the vehicle under light and heavy loads.

The mechanism for conditioning the brake equipment is usually carried by the vehicle body and is movable vertically therewith and is adapted to be controlled according to the position which the body assumes relative to a fixed part of the vehicle truck under light and heavy loads. This fixed part of the truck, as heretofore proposed, has been in the form of a vertically disposed strut which, at its lower end, is supported either directly by the spring plank of the truck or by any other suitable member of the truck which is incapable of vertical movement relative to the side frame. The upper end of the strut is adapted to cooperate with a control cylinder device of the change-over mechanism to control the operation of the mechanism for either light or heavy load service.

There is an increasing interest being shown toward the reduction in the dead weight of railway cars and toward making the trucks of such cars more flexible under ordinary service conditions, and in order to do this it has been proposed to eliminate the truck spring plank which has considerable weight. When the spring plank is omitted from the truck, it is essential that some other support be provided for the change-over control strut and to meet this need it has heretofore been proposed to provide a very light strut support which extends transversely of the truck and which is supported at its ends by the parallel side frames of the truck but which does not serve to tie the side frames together.

When the control cylinder device is carried by the body of the vehicle it is of course very desirable to have the device and the strut for controlling its operation positioned as near as is practicable to the pivotal connection between the vehicle body and truck where variations in the distance between the control cylinder device and the strut, when the body tilts relative to the strut, is so slight as not to interfere with or in any way change the control of the control cylinder device.

The principal object of the present invention is to provide an improved empty and load fluid pressure brake change-over control means which is carried by a truck of a vehicle and which is located at the outer side of one of the truck side frames where it is easily accessible for adjustment, inspection and repair.

Another object of the invention is to provide an improved control means for an empty and load brake change-over apparatus which does not require a control strut supported by a truck spring plank or any other transversely extending strut supporting truck member, thus simplifying the change-over control means and truck construction.

A further object of the invention is to provide an improved control cylinder means for an empty and load fluid pressure brake change-over mechanism and improved means for adjusting the control cylinder means to automatically function to effect the desired operation of the change-over mechanism for either light or heavy braking.

Other objects and advantages will appear in the following more detailed description of the invention.

As shown in the accompanying drawings, Fig. 1 is a fragmentary cross-sectional view of a railway vehicle embodying the invention, the view being taken just ahead of the pivotal connection between the vehicle body and a supporting truck therefor; Fig. 2 is a fragmentary plan view of a portion of the truck showing the empty and load change-over control means mounted thereon, the vehicle body being omitted to more clearly illustrate the invention; Fig. 3 is a side elevational view of a portion of a side frame of the truck and the control means mounted thereon; Fig. 4 is a detail vertical section view drawn on a large scale of the control means; Figs. 5 and 6 are fragmentary sectional views taken on the lines 5—5 and 6—6 respectively of Fig. 4; Fig. 7 is a detail view, mainly in section, of one of the hose couplings carried by the truck bolster and by the body bolster of the vehicle and Fig. 8 is a diagrammatic view partly in section of an empty and load fluid pressure brake equipment adapted to be controlled by the improved control means.

As shown in the drawings, the railway vehicle comprises a body 1 and the usual supporting trucks 2, only a portion of one of the trucks and a portion of the body being shown.

The car truck may comprise the usual spaced side frames 3 which are carried by truck wheels 4 through the medium of the usual axles, axle bearings and journal boxes (not shown), and may also comprise a truck bolster 5 which is carried by the truck frames 3 through the medium of the usual springs 6 which are carried by the bottom members or chords 7 of the side frames. The truck bolster is movable vertically relative to side frames and at each of its ends is slidably guided in the usual bolster guide opening 8 by the adjacent side frame. In the present embodiment of the invention the truck bolster, as shown, is of hollow form and is made of cast metal and, intermediate its ends, is provided with an integral center plate 9 which is adapted to cooperate with the usual body center plate 10, carried by the body bolster 11 of the car body 1, to form the pivotal connection between the truck and car body.

Secured to one end of the truck bolster 5 is a header 12 having fluid conducting passages 13 and 14 which are connected through pipes 15 and 16, respectively, to fluid conducting passages 17 and 18, respectively, in a header 19 secured to a vertically disposed side wall of the truck bolster, said header 19 being located adjacent the truck center plate 9. The passages 17 and 18 of the header 19 are respectively connected through flexible hose connections 20 and 21 to passages 22 and 23, respectively, of a bracket 24, which bracket, in the present embodiment of the invention, is secured to the body bolster 11, at a point adjacent the body center plate 10. The flexible hose connections 20 and 21 are arranged adjacent the pivotal connection between the body and truck of the vehicle where horizontal pivotal movement between the body and truck bolster as well as the sidewise sway of the body bolster relative to the truck bolster is not so great, thus making it possible to employ shorter pieces of hose than would otherwise be the case. By thus keeping the flexible connections short, they are not so liable to become kinked as longer connections when the truck and body bolster are in their normal positions, that is to say, when the bolsters are in vertical alignment with each other as when the vehicle is on a straight stretch of track.

The fluid pressure brake equipment and the change-over valve mechanism associated therewith, as shown in Fig. 8, may be the same as that shown, described and claimed in a pending joint application of Earle S. Cook and myself, Serial No. 51,798, filed November 27, 1935. In view of this the brake equipment and change-over mechanism are briefly described as comprising the usual brake pipe 84, a brake controlling valve device 25, an auxiliary reservoir 26, an emergency reservoir 27, an empty brake cylinder 28 and a load brake cylinder 29, a transfer valve device 31 and a change-over valve device 32.

Since the several parts of the change-over valve mechanism have been fully described in the above mentioned pending application only one portion thereof, namely, the change-over control valve device 33, will be described in more or less detail.

The change-over control valve device 33 may comprise a casing in which there is mounted a flexible diaphragm 34, at one side of which diaphragm is a chamber 35 which is constantly connected through a passage 37 with the atmosphere and at the opposite side of which there is a valve chamber 38 containing a slide valve 39 which is adapted to be operated by a stem 40 operatively secured to the flexible diaphragm. Contained in the chamber 35 is a spring 41 which, at all times, tends to urge the diaphragm, stem and slide valve downwardly. The brake pipe 84 is connected through a branch pipe 42, a combined cutout cock and dirt collector device 43, a filler piece 44 which is clamped between the casings of the brake controlling valve device 25 and cut-out cock and dirt collector 43 and a pipe and passage 45.

Leading from the seat for the slide valve 39 of the valve device 33 to the passage 22 of the bracket 24 is a passage and pipe 36, and leading from the change-over valve device 20 to the passage 23 of the bracket 24 is a pipe 30.

For the purpose of controlling the operation of the change-over control mechanism a control cylinder device 46 is provided which instead of being carried by the vehicle body as is the control cylinder device in the apparatus disclosed in the aforementioned pending application, is preferably carried by the header 12 secured to one end of the truck bolster.

The control cylinder device 46 comprises a vertically disposed cylinder casing which is located outboard of the side frame and at one side of the projecting end of the truck bolster and which is provided with a flange 47 which extends laterally of the bolster into overlapping relation with the outer surface of the header 12 and which is clamped to said header by means of bolts 48.

The cylinder casing is provided with fluid conducting passages 50 and 51 which are open to the clamping face of the flange 47 and which register with the passages 13 and 14, respectively, of the header 12 when the flange is clamped to the header.

Mounted in the cylinder casing for reciprocatory movement relative thereto is a control piston 52 having a piston rod 53 which extends through and is slidably guided in the non-pressure head 54 of the cylinder casing. Contained in a recess formed by an annular flange 55 which projects outwardly from the non-pressure head 54 is a sealing mechanism 56 which surrounds and engages the piston rod to prevent moisture and dirt from entering the cylinder by way of the usual clearance space which is provided between the piston rod and the non-pressure head.

At one side of the control piston 52 is a chamber 57 which is connected to the passage 50 and at the other side of the piston is a non-pressure chamber 58 which is constantly connected to the atmosphere through a downwardly directed breather passage 59 containing straining material 60 which is maintained in place by means of a plug 61 which has screw threaded connection with the casing, said plug having a plurality of narrow slots 62 formed therein providing communication between the passage 59 and the atmosphere. With the piston in its uppermost or normal position, the passage 51 is connected to the non-pressure chamber 58.

Contained in the chamber 58 is a coil spring 63 which is interposed between and operatively engages the control piston 52 and the non-pressure head of the cylinder and which tends, at all times, to urge the piston toward its uppermost or normal position.

The outer end portion 64 of the piston rod is provided with an extension or shoe 65 comprising a sleeve portion 66 which has screw threaded connection with the piston rod to render the extension adjustable relative to the piston rod. To prevent accidental relative rotation between the piston rod and extension 65 there is removably mounted in the piston rod a cotter pin 67 which is adapted to engage the sleeve portion within slots 68 through which the cotter pin is easily accessible for removal from the piston rod and sleeve portion.

The lower end of the extension 65 is adapted to engage with the stop lug 69 of a bracket 70 riveted or otherwise secured to the truck bolster column guide member of the side frame of the truck.

The piston rod, intermediate its ends is provided with a tell-tale means which in the present embodiment of the invention is in the form of a hole 71 of small diameter which when the piston is in its outermost position is adapted to be seen through either one of two notches 72 provided in the annular flange 55 which projects outwardly from the non-pressure head of the cylinder. When the hole can be seen through either notch 72, the one whose duty it is to maintain the brake mechanism properly adjusted, will know that the piston is in its innermost position, thus facilitating the adjustment of the control apparatus, as will hereinafter more fully appear.

The breather passage 59 in the cylinder casing is of larger diameter at its outer or atmospheric end than at its inner end and due to the differences in diameter an annular shoulder 73 is formed in the passage. The straining material 60 in the present embodiment of the invention comprises a piece of felt or other material pervious to air which is made square in cross section and which when forced in place by the plug 61 engages the annular shoulder 73 and completely bridges the portion of the passage 59 which is of the smallest diameter, so that no air can enter the chamber 58 of the cylinder casing without first passing through and being cleansed of moisture and dirt by the straining material 60.

The inner end of the plug 61 is also provided with a plurality of spaced radially arranged grooves 74 through which fluid admitted through the slots 62 is adapted to pass to the space between each of the four sides of the straining material 60 and the adjacent wall of the passage 59 without having to pass through the straining material. It will be appreciated that some of the fluid entering the slots 62 of the plug 61 directly enters the outer end of the straining material and some passes through the grooves 74 and enters the straining material at each of its four sides. Since fluid is free to pass through the straining material from five of its sides the possibilities of the straining material being clogged by dirt or moisture extracted from the fluid are reduced to a minimum.

The ends of the flexible hose 20 and 21 are connected to the header 19 and bracket 24 by means of hose fittings 75, each of which fittings is secured to the respective header or bracket by means of bolts or any other suitable securing medium. Each fitting 75 is provided with a hollow extension 76 over which the adjacent end of the hose is adapted to fit, the extension being provided with an enlarged spherical portion 77 to ensure an airtight fit between the hose and the fitting. Back of the portion 77 the hose is secured to the extension 76 by means of a hose clamp 78.

In most instances the control mechanism for the change-over apparatus will be so adjusted as to assume load position when the vehicle is loaded to slightly more than half of its capacity and such adjustment is preferably made when the vehicle is empty. Assuming the vehicle to be empty, the adjustment is made as follows; the piston rod 53 is moved downwardly manually until the hole 71 is visible through the notches 72. If when the hole is sighted, the extension 65 is in engagement with the lug 69 no adjustment of the extension relative to the piston rod is necessary, but if the extension is not in such engagement when the hole is sighted, the cotter pin 67 is removed and then the extension is rotated toward the left hand until such time as it engages the lug. If when the extension 65 is in engagement with the lug 69, the hole 71 is not in view, the extension is rotated toward the right relative to the piston rod until the hole is in view. When the extension has been adjusted to its proper position as just described, the cotter pin 67 is again secured to the piston rod so as to lock the extension against accidental rotation relative to the piston rod thereby maintaining the extension in its adjusted position.

If at any time it should happen that when the bracket 70 is secured to the side frame in the manner shown in Fig. 3 the extension cannot be adjusted to engage the lug 69, the rivets which secure the bracket to the truck side frame must be removed and the bracket raised so that the holes 79, with which the bracket is provided, register with the corresponding holes in the side frame. When the bracket is thus raised it is again riveted in position.

*Operation of the control means on an empty car*

Normally the spring 63 of the control cylinder device maintains the piston 52, piston rod 53 and piston rod extension 65 in their uppermost position in which the extension is out of engagement with the lug 69 as shown in Figs. 1 and 3 so as to prevent the usual vertical movements of the truck bolster relative to the truck side frame due to service shocks in transit, from being transmitted to the control cylinder device.

According to the invention the control cylinder device 46 functions to control the operation of the change-over valve mechanism for either empty or load service when the equipment is being initially charged with fluid under pressure as will hereinafter more fully appear in the description of the operation of the brake equipment.

Assuming the brake equipment to be at atmospheric pressure, the slide valve 39 of the change-over control valve device 33 will not be in the position in which it is shown in Fig. 8 but will be in its innermost or lower position in which the passage 36 is connected to the slide valve chamber 38, said valve being yieldably maintained in this position by the spring 41 acting through the medium of the diaphragm 34 and diaphragm stem 40. With the slide valve in this position the passage 45 which is connected to the brake pipe 84 remains connected to the valve chamber 38.

In initially charging the brake equipment fluid under pressure supplied to the brake pipe 84 in the usual manner flows through the branch pipe 42, combined cut-out cock and dirt collector device 43 and filler piece 44 to the several chambers of the brake controlling valve device which are to be charged and to the auxiliary and emergency reservoirs 26 and 27, respectively, in the usual manner.

Fluid under pressure not only flows through the filler piece 44 to the brake controlling valve device but also flows to the valve chamber 38 of the control change-over valve device 33 by way of pipe and passage 45. Since the slide valve 39 of the device 33 is in its innermost position, fluid under pressure flows from the valve chamber 38 to the piston chamber 57 of the control cylinder device 46 by way of passage and pipe 36, passage 22 in the bracket 24, hose 20, passage 17 in the header 19 carried by the truck bolster, pipe 15, passage 13 in the header 12 at the end of the bolster and passage 59 in the flange and casing of the cylinder control device.

When the pressure of fluid in piston chamber 57 has been increased to about thirteen pounds, the piston 52 and thereby the piston rod 53 and piston rod extension 65 will be caused to move downwardly against the opposing pressure of the spring 63.

Since the car is empty, the piston 52 will move far enough to connect the passage 51 to the piston chamber 57 and when this communication has been established the piston rod extension 65 is engaged by the lug 69 thus bringing the piston to a stop. Fluid under pressure now flows from chamber 57 to the change-over valve device 32 by way of passage 51, passage 14 in the header 12 at the end of the truck bolster, pipe 16, passage 18 in the header 19, hose 21, passage 23 in the bracket 24 and pipe 30.

Fluid under pressure thus supplied to the change-over valve device causes the device to assume empty position if it is not already in this position.

Now when the pressure of fluid in valve chamber 38 of the control valve device 33 has been increased to about thirty pounds, the flexible diaphragm 34 will be caused to flex upwardly against the opposing pressure of the spring 41, said diaphragm as it is thus flexed acting, through the medium of the diaphragm stem 40, to shift the slide valve 39 to the position in which it is shown in Fig. 8. In this position a cavity 80 in the valve connects passage 36 to a passage 81 which leads to the atmosphere. Since the piston chamber 57 is in communication with the passage 36 fluid under pressure is vented from the piston chamber 57. When due to the flow of fluid from the piston chamber 57 to the atmosphere, the pressure of fluid in said chamber has reduced to slightly below the value of the spring 63 (thirteen pounds), said spring acts to move the control piston 52 and consequently the piston rod 53 and piston rod extension 65 to their uppermost position as shown in Figs. 1 and 3. The piston after it has moved a short distance toward its upper position first cuts off the communication between the control piston chamber 57 and passage 51 which is in communication with the change-over valve device and then connects the passage 51 to the chamber 58, so that fluid under pressure is now vented from the change-over valve device.

Now when a reduction in brake pipe pressure is effected, the brake equipment will function in the same manner as described in the aforementioned pending application to supply fluid under pressure to the empty brake cylinder 28 to effect light braking of the car.

*Operation of the control means on a loaded car*

When the car is carrying a load of more than half of its capacity, the distance between the lower surface of the piston rod extension 65 of the control cylinder device 46 and the upper surface of the lug 69 of the bracket 70, due to the compression of the truck springs 6, will be such that when fluid under pressure is supplied to the control piston chamber 57 of the control cylinder device 46, the extension 65 will be engaged by the lug 69 and the piston 52 thereby brought to a stop before it can uncover the passage 51 to the chamber 57. The piston in this position will not close communication from the passage 51 and consequently from the pipe 30 to the chamber 58 which is at atmospheric pressure.

When the pressure of fluid in passage 36 has been increased to about twenty pounds fluid under pressure is caused to flow from the passage 36 to the change-over valve device in the same manner as described in the aforementioned pending application. With the passage 51 and consequently the pipe 30 at atmospheric pressure, fluid under pressure flowing from the passage 36 to the change-over valve device causes the device to assume heavy or load braking position.

When the pressure of fluid in slide valve chamber 38 of the control valve device 33 has been increased to around thirty pounds, the diaphragm 34 flexes and causes the slide valve 39 to be shifted to the position in which it is shown in Fig. 8, in which position the cavity 80 connects passage 36 to the passage 81 leading to the atmosphere so that fluid under pressure is vented from the piston chamber 57 of the cylinder control valve device. With the chamber 57 thus vented, the spring 63 acts to move the control piston 52 and thereby the piston rod 53 and piston rod extension 65 to their upper position in which the extension is out of contact with the stop lug 69.

Now when a reduction in brake pipe pressure is effected, the brake equipment will function in the same manner as described in the aforementioned pending application to supply fluid under pressure to both the empty brake cylinder 28 and the load brake cylinder 29 to effect heavy braking of the car.

It will be understood that the operation of the change-over valve mechanism to condition the fluid pressure brake equipment for either light or heavy braking will be identical with that of the corresponding mechanism disclosed in the aforementioned pending application and for this reason only those parts of the mechanism which are under the control of the control cylinder device or which exercise some control over the control cylinder device have been described in more or less detail.

It will also be understood that with the brake equipment conditioned for either light or heavy braking the release of the brakes will be accomplished in the same manner as described in said pending application.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a controlling mechanism for an automatically operative change-over apparatus of an empty and load fluid pressure brake equipment, in combination, a vehicle truck comprising a truck frame, a truck bolster movable vertically relative to said frame according to the load on the vehicle, a laterally extending lug rigidly connected to said frame and projecting outwardly from an outer vertically disposed face of the side frame, and means disposed above said lug and carried by said bolster operated by fluid under pressure for controlling the operation of said change-over apparatus, said lug being adapted to cooperate with said means to control the operation of said means according to vertical movement of said bolster relative to said side frame and lug.

2. In an empty and load brake equipment for a vehicle, in combination, a vehicle body, a truck comprising a truck frame and a truck bolster pivotally connected to and supporting said body, said truck bolster being movable vertically relative to said truck frame according to the load on the body, fluid pressure brake apparatus carried by said body operative at one time to produce a light degree of braking and operative at another time to produce a heavy degree of braking, means carried by said truck and controlled according to the vertical movement of said truck bolster relative to said truck frame and by fluid under pressure for conditioning the fluid pressure brake apparatus for either light or heavy braking, and fluid conducting control conduits connecting said fluid pressure brake apparatus and means, the portions of said conduits bridging the space between said body and truck being flexible to accommodate relative pivotal movement between said truck and body and the portions of said conduits extending from the flexible portions to said means being enclosed by said bolster.

3. In an empty and load brake equipment for a vehicle, in combination, a vehicle body, a truck comprising a truck frame and a truck bolster pivotally connected to and supporting said body, said truck bolster being movable vertically relative to said truck frame according to the load on the body, fluid pressure brake apparatus carried by said body operative at one time to produce a light degree of braking and operative at another time to produce a heavy degree of braking, means carried by said truck bolster and controlled according to the vertical movement of said truck bolster relative to said truck frame and by fluid under pressure for conditioning the fluid pressure brake apparatus for either light or heavy braking, fluid conducting control pipes connected with said means and carried and enclosed by said truck bolster, corresponding fluid conducting control pipes connected with the fluid pressure brake apparatus, and flexible conduits connecting the control pipes in the vicinity of the pivotal connection between said truck bolster and body.

4. In a vehicle empty and load fluid pressure brake equipment adapted to be automatically conditioned for either light or heavy braking, in combination, a vehicle on which the brake equipment is mounted, a truck comprising a side frame and a truck bolster pivotally connected to and supporting said body, said truck bolster being movable vertically relative to the side frame according to the load on the body, means carried by said truck and operative by fluid under pressure supplied from said fluid pressure brake equipment when the equipment is being charged and according to the vertical movement of said bolster relative to said side frame for effecting the conditioning of the brake equipment for either light or heavy braking, and fluid conducting control conduits connecting said means and brake equipment, said conduits extending from said truck to said body adjacent the pivotal connection between said truck bolster and body.

5. In a vehicle empty and load fluid pressure brake equipment adapted to be automatically conditioned for either light or heavy braking, in combination, a vehicle on which the brake equipment is mounted, a truck comprising a side frame and a truck bolster pivotally connected to and supporting said body, said truck bolster being movable vertically relative to the side frame according to the load on the body, means carried by said truck and operative by fluid under pressure supplied from said fluid pressure brake equipment when the equipment is being charged and according to the vertical movement of said bolster relative to said side frame for effecting the conditioning of the brake equipment for either light or heavy braking, and fluid conducting control conduits connecting said means and brake equipment, said conduits extending laterally of the truck to a point adjacent the pivotal connection between said truck bolster and body and then upwardly across the space between said truck and body to the brake equipment.

6. In a vehicle empty and load fluid pressure brake equipment adapted to be automatically conditioned for either light or heavy braking, in combination, a vehicle on which the brake equipment is mounted, a truck comprising a side frame and a truck bolster pivotally connected to and supporting said body, said truck bolster being movable vertically relative to the side frame according to the load on the body, means carried by said truck bolster and operative by fluid under pressure supplied from said fluid pressure brake equipment when the equipment is being charged and according to the vertical movement of said bolster relative to said side frame for effecting the conditioning of the brake equipment for either light or heavy braking, and fluid conducting control conduits connecting said means and brake equipment, said conduits extending longitudinally through said bolster to a point adjacent the pivotal connection between said truck bolster and body and then upwardly to the brake equipment carried by the body, the upwardly extending portions of said conduits being flexible to accommodate relative pivotal movement between said truck bolster and body.

7. In a controlling mechanism for an automatically operative change-over apparatus of an empty and load fluid pressure brake equipment, in combination, a vehicle truck comprising a truck frame, a truck bolster movable vertically relative to said frame according to the load on the vehicle, a lug rigidly connected to said frame and projecting outwardly therefrom, means carried by said bolster operated by fluid under pressure for controlling the operation of said change-over apparatus, said lug being adapted to cooperate with said means to control the operation of said means according to vertical movement of said bolster relative to said side frame and lug, and means operative manually for adjusting said means relative to said lug to ensure the desired control operation of said means.

8. In a controlling mechanism for an automatically operative change-over apparatus of an empty and load fluid pressure brake equipment, in combination, a vehicle truck having an element, a truck bolster movable vertically relative to said element according to the load on the vehicle, and means adapted to cooperate with said bolster and element and operative according to the vertical movement of said bolster relative to said element for controlling the operation of said change-over apparatus, said means comprising a movable control member having two control positions, a shoe having screw threaded connection with one end of said member, and a stop adapted to engage said shoe to position said control member according to the vertical movement of the truck bolster relative to said element, said stop being adapted to be secured to the truck in either one of two positions vertically of the truck and said shoe being adjustable relative to said member and element.

9. In a cylinder mechanism comprising a casing, a piston mounted to reciprocate in said casing, a pressure chamber at one side of said piston and a non-pressure chamber at the other side of the piston, a breather passage leading from the atmosphere to said non-pressure chamber, a section of straining material in said breather passage completely bridging a portion of said passage and only partially bridging another portion of the passage to permit air entering the breather passage from the atmosphere to enter the outer end and sides of said section of straining material, and a plug having screw threaded connection with said casing for maintaining said section of straining material in the breather passage, said plug having openings through which air flows to the end of said strainer and having grooves through which air flowing to the end of said section of straining material is permitted to flow to the sides of said section.

10. In a controlling mechanism for an automatically operative change-over apparatus of an empty and load fluid pressure brake equipment, in combination, a vehicle truck comprising a side frame having a truck bolster accommodating opening formed therein, a truck bolster movable vertically relative to said side frame according to the load on the vehicle and extending through said opening and beyond the outer side of the side frame, and pressure responsive means located beyond the outer side of said side frame adapted to cooperate with said side frame and the projecting end of said truck bolster and operative by fluid under pressure according to the vertical movement of said bolster relative to said side frame for controlling the operation of said change-over apparatus.

11. In a controlling mechanism for an automatically operative change-over apparatus of an empty and load fluid pressure brake equipment, in combination, a vehicle truck comprising a side frame having a truck bolster accommodating openings formed therein, a truck bolster movable vertically relative to said side frame according to the load on the vehicle and extending through said opening and beyond the outer side of the side frame, and pressure responsive means secured to the end face of the truck bolster adapted to cooperate with said side frame and operative by fluid under pressure according to the vertical movement of said bolster relative to said side frame for controlling the operation of the change-over apparatus.

12. In a vehicle empty and load fluid pressure brake equipment adapted to be automatically conditioned for either light or heavy braking, in combination, a vehicle body on which the brake equipment is mounted, a truck comprising a side frame and a truck bolster pivotally supporting said body and being movable vertically relative to the side frame according to the load on the body, a header secured to one end of the bolster, means secured to said header operative by fluid under pressure supplied from said fluid pressure brake equipment when the equipment is being charged with fluid under pressure and according to the vertical movement of said bolster relative to the side frame for conditioning the equipment for either light or heavy braking, and fluid pressure control communications connecting said means and fluid pressure brake equipment, said communications extending through said header and longitudinally through said bolster to a point adjacent the pivotal support for the vehicle body and from thence to the fluid pressure brake equipment.

13. In a vehicle empty and load fluid pressure brake equipment adapted to be automatically conditioned for either light or heavy braking, in combination, a vehicle body on which the brake equipment is mounted, a truck comprising a side frame and a truck bolster pivotally supporting said body and being movable vertically relative to the side frame according to the load on the body, a header secured to one end of the bolster, means disposed at one side of said bolster and secured to said header operative by fluid under pressure supplied from said fluid pressure brake equipment when the equipment is being charged with fluid under pressure and according to the vertical movement of said bolster relative to the side frame for conditioning the equipment for either light or heavy braking, and fluid pressure control communications connecting said means and fluid pressure brake equipment, said communications extending through said header and longitudinally through said bolster to a point adjacent the pivotal support for the vehicle body and from thence to the fluid pressure brake equipment.

14. In a vehicle empty and load fluid pressure brake equipment adapted to be automatically conditioned for either light or heavy braking, in combination, a vehicle on which the brake equipment is mounted, a truck comprising a side frame and a truck bolster pivotally supporting said body and being movable vertically relative to the side frame according to the load on the body, a header secured to one end of the bolster, means secured to said header operative by fluid under pressure supplied to said fluid pressure brake equipment when the equipment is being charged with fluid under pressure and according to the vertical movement of said bolster relative to the side frame for conditioning the equipment for either light or heavy braking, a header secured to one side of said bolster adjacent the pivotal support for said body, and fluid pressure control communications connecting said means and fluid pressure brake equipment, said communications extending through those on said header and longitudinally through said bolster and from the header secured to the side of the bolster to the fluid pressure brake equipment.

ELLIS E. HEWITT.